US006869360B2

(12) United States Patent
Marks et al.

(10) Patent No.: US 6,869,360 B2
(45) Date of Patent: Mar. 22, 2005

(54) GAMING APPARATUS AND METHOD INCLUDING A MULTIPLIER FEATURE AND BONUS FEATURES

(75) Inventors: Howard M. Marks, Westport, CT (US); Anthony M. Singer, Ringwood, NJ (US); Daniel M. Marks, Brooklyn, NY (US)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

(21) Appl. No.: 09/960,179

(22) Filed: Sep. 20, 2001

(65) Prior Publication Data

US 2003/0054875 A1 Mar. 20, 2003

(51) Int. Cl.[7] .................................................. A63F 13/00
(52) U.S. Cl. ............................................ 463/25; 463/20
(58) Field of Search ........................... 273/138.1, 138.2, 273/139, 143 R, 460; 463/16–20, 22, 25, 30

(56) References Cited

U.S. PATENT DOCUMENTS

| | | | | |
|---|---|---|---|---|
| 5,513,846 A | * 5/1996 | Niederlein et al. | ..... | 273/143 R |
| 5,971,849 A | * 10/1999 | Falciglia | ...................... | 463/16 |
| 6,155,925 A | * 12/2000 | Giobbi et al. | ................. | 463/20 |
| 6,159,097 A | * 12/2000 | Gura | .......................... | 463/20 |
| 6,254,481 B1 | * 7/2001 | Jaffe | .......................... | 463/20 |
| 6,309,300 B1 | * 10/2001 | Glavich | ....................... | 463/26 |
| 6,328,649 B1 | * 12/2001 | Randall et al. | ............... | 463/20 |
| 6,347,996 B1 | * 2/2002 | Gilmore et al. | ............... | 463/17 |
| 6,450,883 B1 | * 9/2002 | O'Halloran | .................. | 463/16 |
| 6,471,208 B2 | * 10/2002 | Yoseloff et al. | ......... | 273/143 R |
| 6,482,089 B2 | * 11/2002 | DeMar et al. | ................ | 463/20 |
| 2004/0147300 A1 | * 7/2004 | Seelig et al. | ................... | 463/1 |

FOREIGN PATENT DOCUMENTS

| | | | | |
|---|---|---|---|---|
| EP | 000449433 A2 | * 10/1991 | ........... | G07F/17/34 |
| GB | 2 062 922 | * 5/1981 | ........... | G07F/17/34 |
| GB | 2 090 690 | * 7/1982 | ........... | G07F/17/34 |
| GB | 2 183 882 | * 12/1985 | ........... | G07F/17/34 |
| GB | 2 170 636 | * 2/1986 | ........... | G07F/17/34 |

OTHER PUBLICATIONS

Fey, Marshall, Slot Machines: A Pictorial History of the First 100 Years, 1997, Liberty Belle Books, Fifth Edition, see enclosed pages.*

* cited by examiner

*Primary Examiner*—John M. Hotaling, II
(74) *Attorney, Agent, or Firm*—Robert Ryan Morishita; Anderson & Morishita, LLC

(57) ABSTRACT

A device and method are set forth for a video slot machine where a player makes a wager to enable one or more pay lines for a game matrix. Game symbols are randomly selected and assigned into the matrix to define winning and losing game symbols combinations for each activated pay line. An active border at least partially surrounding the matrix is displayed and configured to randomly select and display game multipliers, pay line multipliers, free plays and a bonus condition to be fulfilled by the selection of one or more game symbols. A scatter bonus is also provided.

16 Claims, 9 Drawing Sheets

GAMING APPARATUS AND METHOD INCLUDING A MULTIPLIER FEATURE AND BONUS FEATURES

FIELD OF THE INVENTION

The present invention relates to electronic gaming devices and methods using selected and displayed symbol combinations to determine winning and losing outcomes and where a multiplier and bonus features are provided. More particularly it relates to such apparatus and methods which include a multiplier randomly applied to one or more pay lines of a slot machine game.

BACKGROUND

Video slot machines are well known and are quite popular with players. In a basic form, the player makes a wager to play the game and enables one or more pay lines on a video display. Upon prompting play, a processor selects and displays game symbols on the display in a matrix form, typically in a three row, five column matrix. Each column represents a reel for the slot machine. The symbols on any enabled pay line are compared to a schedule of winning outcomes to determine if a winning or a losing outcome have been obtained. Where a winning outcome is obtained the player receives an award based upon an established pay table for the game. The player then makes another wager, enables one or more pay lines and plays another game (often referred to as a "hand" or "spin").

The awards issued can be game credits, prizes or the like. For actual casino games, the awards correspond to a monetary amount or a physical prize. For novelty versions of these games, the award is simply accumulation of game credits.

To make such games more entertaining, it is known to provide certain configurations of bonuses. The bonus may be triggered by a certain combination of symbols on a pay line or scattered on the display (a "scatter prize"). It is also known to provide secondary screens for issuing a bonus. That is, when the player obtains a certain, predetermined outcome, the game processor displays a secondary screen where the player can select from certain options to obtain their bonus. For example, in one game, the player selects by a touch screen from between several displayed "pigs", the selected pig, in an animated fashion, revealing the bonus. The bonus can be a fixed amount, usually a function of the amount wagered, or a multiplier which multiplies the amount won.

In the aforementioned games, the game matrix includes a static border, which may be only used to display the amount of the wager for each enabled pay line. There is a need for a new game which employs and uses the game matrix border as a means to display the selection of multipliers, bonuses, free spins or the like.

There is also need for a new game which provides for new and different bonuses to enhance the entertainment value of the game for the player.

There is also a need for a game which includes multiple bonus offerings for a primary game wherein the primary game and bonuses can be cooperatively themed.

SUMMARY OF THE INVENTION

There is, therefore, set forth according to the present invention an apparatus and method for playing an electronic game which provides winning and losing outcomes, and which includes an active border or margin by which bonuses can be enabled and/or game win multipliers established for the spin of play. There are also set forth one or more additional, different screen bonuses for the game, all of which can have a cooperative theme.

According to one embodiment, an electronic apparatus and method for playing a casino game according to the present invention are set forth which includes a video display to display the game action. A data structure stores data corresponding to game symbols. The symbols used may be consistent with the theme of the game, numbers, fruit, or other symbols or indicia which may be desired. A game matrix is displayed at the display to define virtual reels, such as three or more reels for the game, each displaying three symbols. Also defined on the game matrix are pay lines, such as nine pay lines, in various patterns. The player makes wagers which are allocated to and activate one, several or all pay lines.

Upon prompting of the processor, game symbols are randomly selected and assigned to the coordinates of the game matrix, i.e. to the reels to define a game spin outcome. Predetermined combinations of symbols on enabled pay lines define winning or losing outcomes. For winning outcomes, awards are won according to a predetermined pay schedule.

In addition to the game matrix, the processor is configured to display one or more of a multiplier, free spin or on screen bonus to be awarded based upon the game spin outcome. If a multiplier is selected, winning outcome awards are multiplied. In the event a free spin is selected, the player is entitled to one or more free spins. If a bonus is selected, the player may be entitled to a bonus depending upon the game spin outcome.

The selection of the multiplier, free spin or bonus is preferably embodied as an active border for the game matrix. Upon selection of any multiplier, free spin or bonus, the border displays a symbol or indicator for the player to see.

The display of the multiplier, free spin or bonus preferably precedes the display of the game matrix outcome. However, the display may be substantially simultaneous or subsequent to the game matrix outcome.

Accordingly the apparatus and method of the present invention provides a primary game where a player can obtain winning combinations with game symbols and a game where a player can win one or more different bonuses, free spins and game or line pay multipliers. The active game display margin acts as an additional reel for the game to select multipliers, free spins and certain bonus features.

BRIEF DESCRIPTION OF THE DRAWINGS

These and other features and advantages will become appreciated as the same becomes understood with reference to the claims, description and drawings wherein:

DESCRIPTION

Figure 1:
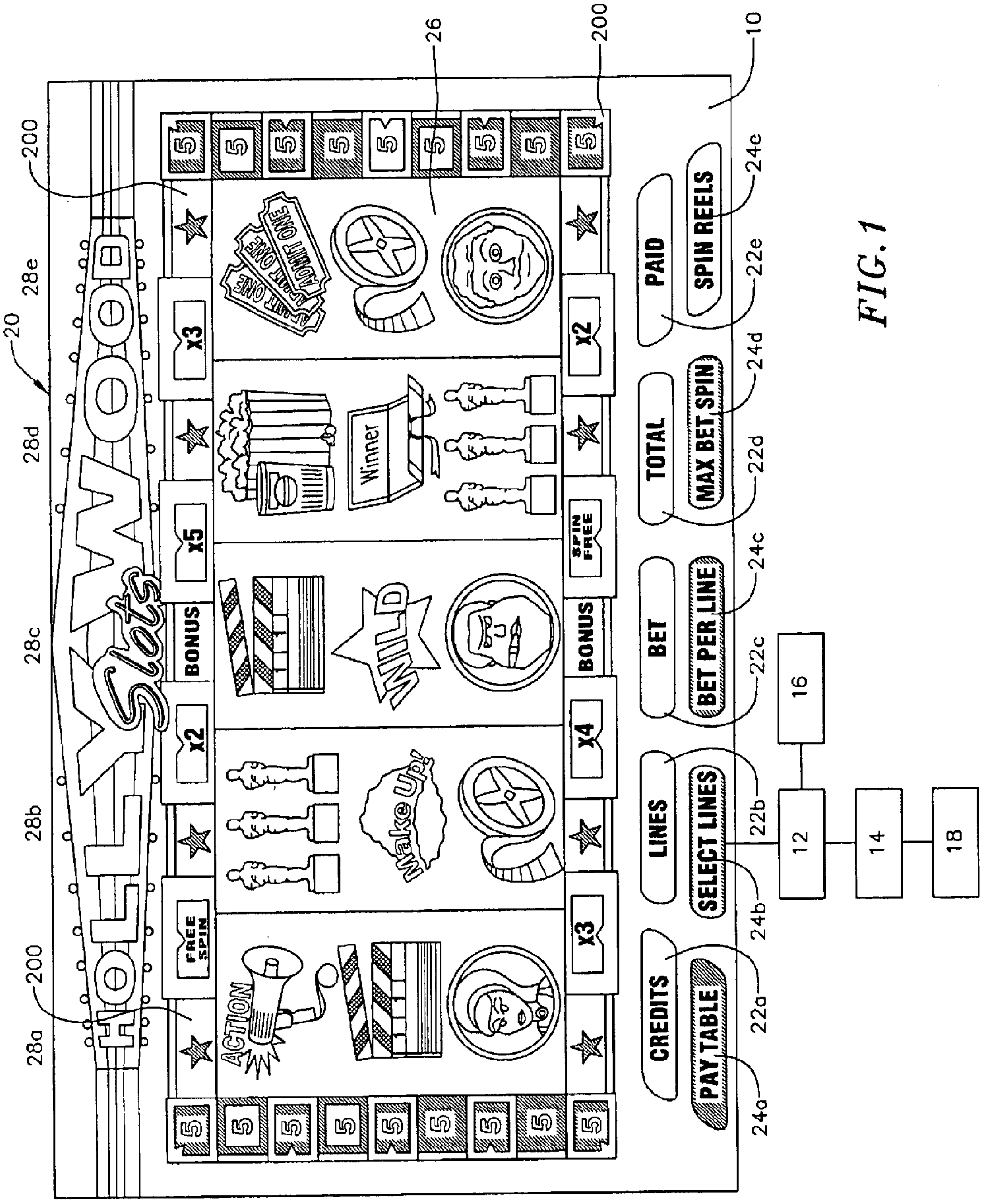
FIG. 1 shows a game display and input device for the game of the present invention and certain displayed game and bonus symbols.

Turning to FIG. 1 there is shown a video display 10 for the apparatus and method game of the present invention. The display 10 may be embodied as a video display 10 for a casino gaming device, computer monitor where the game of the present invention is played for entertainment or through the Internet or the display 10 may be embodied on a hand-held device such as a personal data assistant (PDA) or hand held gaming device or any other suitable and compatible electronic display.

While the following description is directed to a casino gaming apparatus where monetary units or their equivalent, such as accumulated gaming credits, are wagered and won, it should be understood that the method and device can be practiced as a novelty game where fictitious gaming credits are wagered and won.

The display 10 is contained in a supporting housing (not shown) which includes the various components including a controlling computer processor 12, wager accepting means 14, data storage data structure 16 and pay out device 18 of the type generally known in the art. Preferably, the display 10 is embodied as a touch screen display which also provides means for the player to control the play of the game. Alternatively, the play control means may be any suitable data input means such as game control buttons, keyboard, mouse or the like. For purposes of the following description, these data input means will be referred to as a touch screen display 10.

The wager accepting means 14 includes one or more of a token/coin acceptor, cash validator and acceptor, credit/debit card reader or other suitable means for a player to make wagers to play the game as is known in the art. The data structure 16 may be embodied as any suitable memory device including a random access memory (RAM), compact disk or other compatible memory device. Finally, the pay out device 18 may be embodied as a hopper to receive coins/tokens and dispense the same, means for accumulating game play credits, a device for writing to a credit voucher or to a credit storage device or remote electronic account or the like as is known in the art.

With continuing reference to FIG. 1, the processor 12 controls the display 10 and play of the game of the method. For the player to control the action of the game method, the touch screen display 10 includes a game play area 20 where symbols, displays and secondary screens are displayed as well as areas to impart information to the player and for the player to input data to the processor 12. Certain of these areas are allocated for display only and do not provide for touch screen input to the processor 12. For example, credit area **22*a* on the display 10 displays the total amount of accumulated credits for play of the game. Line area 22*b* displays the number of enabled pay lines being played by the player and bet area 22*c* displays the amount of credits wagered per enabled pay line whereas total area 22*d* displays the total amount of the wager. Paid area 22*e*** displays the total amount paid to the player in coins, tokens or credits, for a winning outcome and/or bonus as hereinafter described.

In addition to the foregoing areas, certain portions of the display 10 define touch input buttons for inputting information to the processor 12 for controlling the action. Pay table button **24*a*, if touched by the player, prompts the processor 12 to display the various winning outcomes and the pay for each. The select lines button 24*b* enables the player to input data to the processor 12 to enable a player selected number of pay lines on the display 10 and the bet per line button 24*c* enables the player to input data to the processor to bet a selected amount per line. The max bet button 24*d* enables the player to enable all pay lines and enter a maximum wager for each for the next spin of the game. The spin reels button 24*e*, if touched by the player, prompts the processor 12 for the play of the game. The aforementioned input buttons 24*a–e* and display areas 22*a–e*** are generally known in the art.

The processor 12 is configured to display in the game play area 20, a primary game matrix 26 of coordinates shown for purposes of this description as a three-by-five matrix 26. During play of the method, symbols as hereinafter described are selected and displayed in each coordinate of the matrix 26. As shown in FIG. 1, the matrix 26 may be displayed in a fashion of five simulated slot machine reels **28*a–e* which correspond to the five columns (Y) of the matrix 26. Each reel 28*a–e* includes three coordinates (X) defining the primary game matrix 26**.

Figure 2:
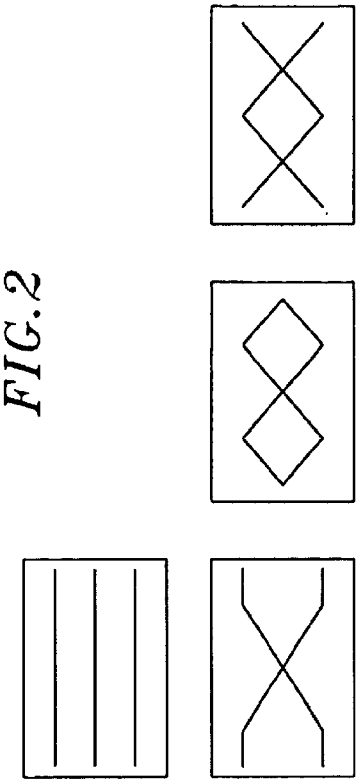
FIG. 2 shows the patterns of pay lines which may be enabled for the game.

To play the primary game the player enables one or more of nine pay lines as shown in FIG. 2. To enable a pay line the player allocates a wager to the pay line. A protocol is established, as is known in the art, for allocating wagers as they are made, e.g. horizontal pay lines first, diagonal pay lines second, and so forth. Where the player wagers less than the maximum he allocates wagers, preferably, in blocks of nine units (to enable each of the nine pay lines). However a player may enable, for example, seven lines and allocate wagers in multiples of seven units to the predetermined game maximum such as five units per pay line.

When play of the game is prompted by the player touching spin button **24*e* or the max bet button 24*d*, the processor 12 selects and displays, in the form of game symbols, data from the data structure 16 into the coordinates of the game matrix 26 and for the reels 28*a–e* to define one or more outcomes for the play of game spin. The selection of game symbols is based, for a casino game, upon configuration of the data structure 16, processor and a random number generator (RNG). Symbol data is stored and/or selected based upon a predetermined distribution such that each symbol has a predetermined, statistical probability of being selected, as is known in the art. The processor 12 is configured to simulate rotation of the reels 28*a–e*** in advance of the display of the symbols to convey an impression of mechanical spinning reels.

Figure 4:
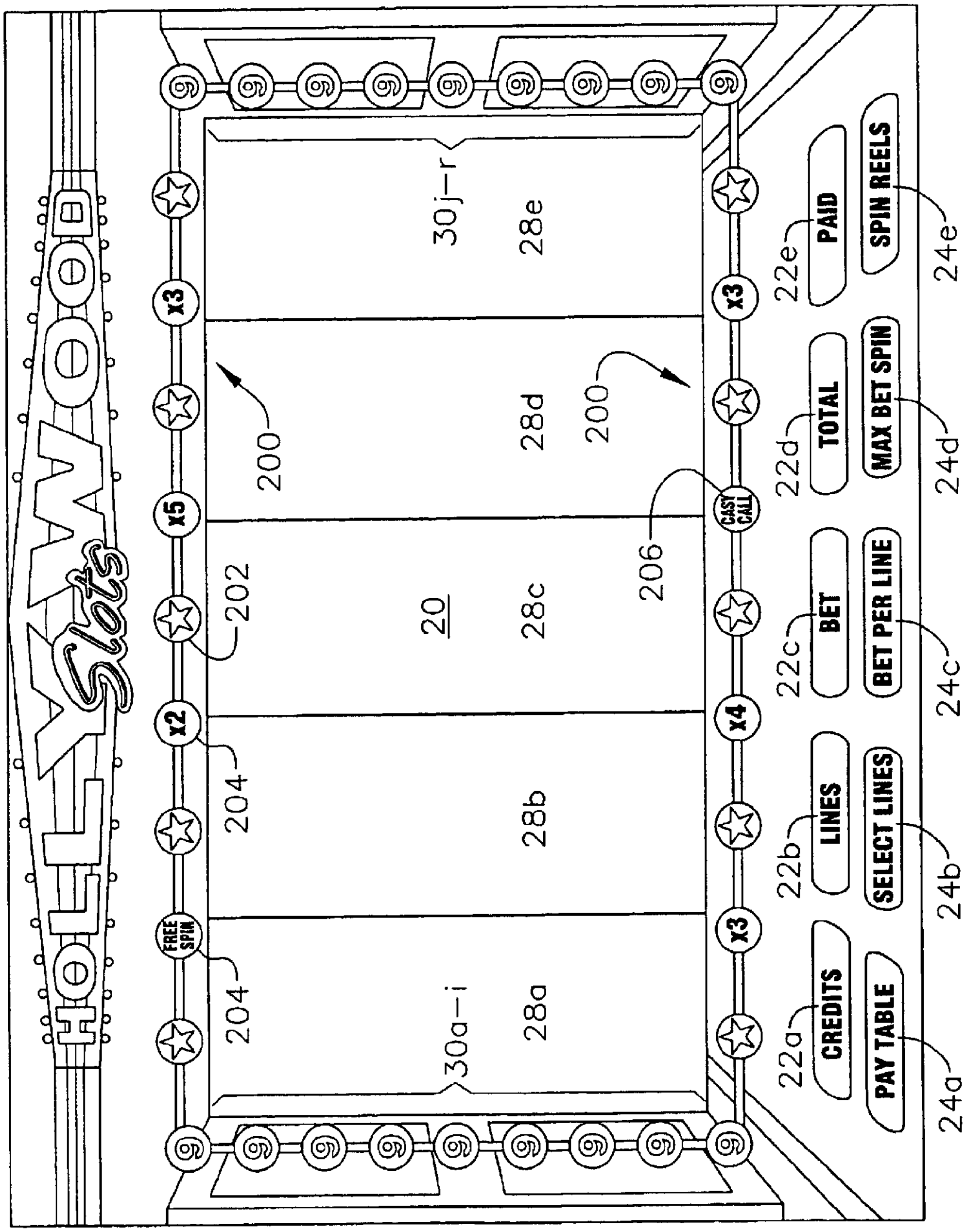
FIG. 4 shows the game matrix and active border according to the present invention.

Cooperating with the matrix 26, the processor 12 is configured to display the various pay lines for the matrix 26 grid. FIG. 2 shows various patterns of the pay lines which may be enabled for the game method. With reference to FIGS. 1 and 4, markers **30*a–r* at the right and left hand margins of the game play area 20 of the display 10** indicate the enabled pay line(s) and the amount wagered per each enabled pay line.

Figure 3:
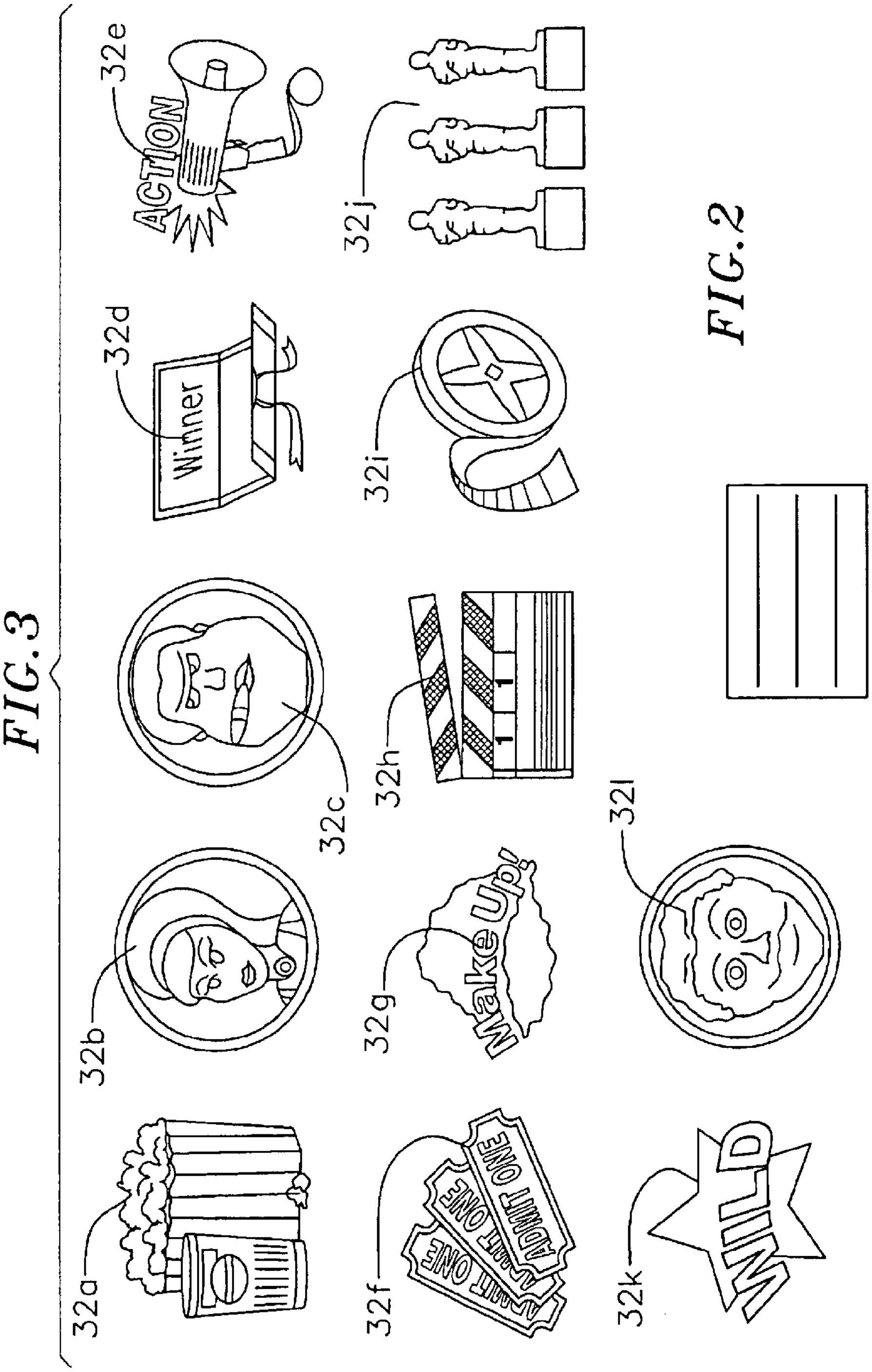
FIG. 3 shows examples of certain game symbols for the game.

FIG. 3 shows an example of various game symbols **32*a–l* for the game of the embodiment showed herein. Certain of the symbols, as hereinafter described, may also be used to trigger certain game bonuses. The apparatus and method as herein described are directed to a motion picture theme and accordingly, consistent with the theme of the game, the various game symbols 32*a–l* represent motion picture characters, equipment and awards. It should be understood that the apparatus and method could apply to any other theme as well. Data representing the symbols is stored in the data structure 16** in a fashion that, in cooperation with the RNG, each symbols has a predetermined statistical probability for being selected.

In addition to the game symbols 32*a–l* shown in FIG. 3, there is, according to the embodiment described herein, a "Hollywood" bonus symbol, the purpose of which will be described.

The processor 12 is also configured to control the display 10 to display about the game display 20 an active border 200 including a plurality of on-screen bonus symbols displayed in a spaced relationship as well as including the pay line markers 30*a–r*. The arrangement of the on-screen bonus symbols may be fixed or, prior to a spin, positions may be changed in a predetermined manner or at random. In the embodiment shown in FIGS. 1 and 4, the on screen bonus symbols are in fixed positions in the margin 200.

Prior to, substantially simultaneously with or subsequent to the display of the selected game symbols on the reels 28*a–e*, the processor 12 is configured to select and display at the border 200 an indication that a multiplier, bonus, free spin or no action condition will be applied to the game. Preferably by simulating the spinning of an indicator about the active border 200 which, upon stopping, denotes the applied bonus, if any. As hereinafter described, the multiplier condition can be applied to one or more individual, activated, pay lines or the entire spin outcome (all winning pay line combinations). The bonus condition may result in a predetermined bonus award, an on-screen bonus which requires one or more designated game symbols to be displayed on the reels 28*a–e* or a second screen bonus. The free spin condition awards a free next game spin (with the same wager and activated pay lines). The no action condition indicates that there is no bonus, free spin or multiplier (exemplified by the "Star" symbol. The processor 12 may be configured to apply one or more of the active border 200 features to the game and method. Depending upon which border feature is selected, symbols in the border 200 will be displayed to inform the player of the feature selected.

According to the embodiment shown, the border 200 is displayed to appear as a motion picture marquee. Upon the selection of the border feature(s), the border 200 may be displayed as illuminating the various border feature symbols in the fashion of sequential lights to enhance the theme of the game.

Figure 7:
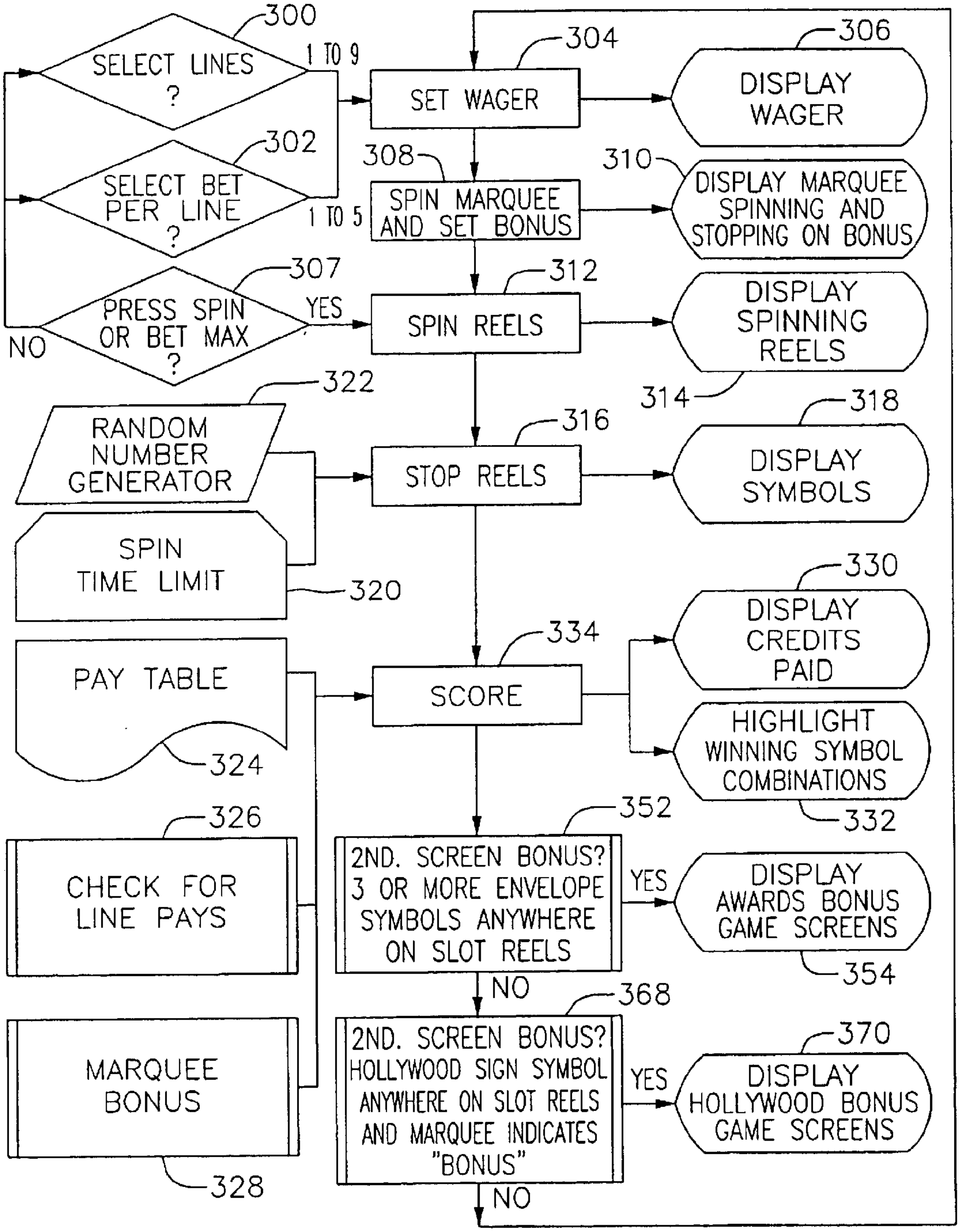
FIG. 7 is a flowchart for the game.

With reference to FIGS. 1 and 4, the on-screen bonus symbols, according to the embodiment and theme shown, include stars 202 which indicate a no action condition, a free spin symbol 204, a cast call symbol 206 indicating an on-screen bonus condition and multiplier symbols 208 along with the markers 30*a–r*. With reference to FIG. 1, the multiplier symbols 208 can have varying values of 2–5. For example, before the spin of the reels 28*a–e*, the border 200 may sequentially highlight the border symbols and markers 30*a–r* and finally illuminate or highlight the border symbol or marker 30*a–r* selected. The selection is then applied to the outcome of the spin for the primary game. With reference to FIG. 7, the play of the game will now be described.

At 300 and 302, the player selects the number of pay lines to play and the wager to be made for each pay line. The processor 12 at 304 sets the wager for each pay line and controls the display 10 at 306 to display a marker 30*a–r* for each activated pay line and the amount of the wager for the pay line as well as displaying the corresponding wager and total wager in the bet area 22*c* and 22*d*. Upon prompting of play of the game spin at 307, the processor 12 controls the display 10 to display at 308, 310 the border 200 and the selection of the border feature. Upon selection and display of the border feature, the processor 12 controls the display 10 to display the reels 28*a–e* spinning at 312, 314 and at 316 the reels 28*a–e* are stopped to display at 318 the game outcome symbols. The spinning and stopping of the displayed reels 28*a–e* is controlled by a spin time limit 320. The selection of the game symbols is influenced by the random number generator at 322.

Based upon a predetermined pay table stored in memory at 324 listing winning symbol combinations, the processor at 326 compares the symbol combinations displayed on activated pay lines to those of the pay table to, at 326, determine the award, if any. The award is based upon the winning combination and the amount wagered for the pay line having the winning combination. An example of a pay table which may be applied is set forth in Table 1 below.

TABLE 1

(award × line wager)

| Game Symbol | No. on pay line | Award |
|---|---|---|
| 32a | 5 | 25 |
| | 4 | 6 |
| | 3 | 2 |
| 32b | 5 | 600 |
| | 4 | 120 |
| | 3 | 12 |
| | 2 | 3 |
| 32c | 5 | 800 |
| | 4 | 160 |
| | 3 | 16 |
| | 2 | 4 |
| 32e | 5 | 25 |
| | 4 | 6 |
| | 3 | 2 |
| 32f | 5 | 50 |
| | 4 | 12 |
| | 3 | 4 |
| 32g | 5 | 75 |
| | 4 | 20 |
| | 3 | 6 |
| 32h | 5 | 100 |
| | 4 | 30 |
| | 3 | 10 |
| 32i | 5 | 150 |
| | 4 | 60 |
| | 3 | 20 |
| 32j | 5 | 300 |
| | 4 | 100 |
| | 3 | 30 |
| 32l | 5 | 400 |
| | 4 | 80 |
| | 3 | 8 |
| | 2 | 2 |

The "wild" game symbol 32*k* is wild for any of the above game symbols.

Figure 8:
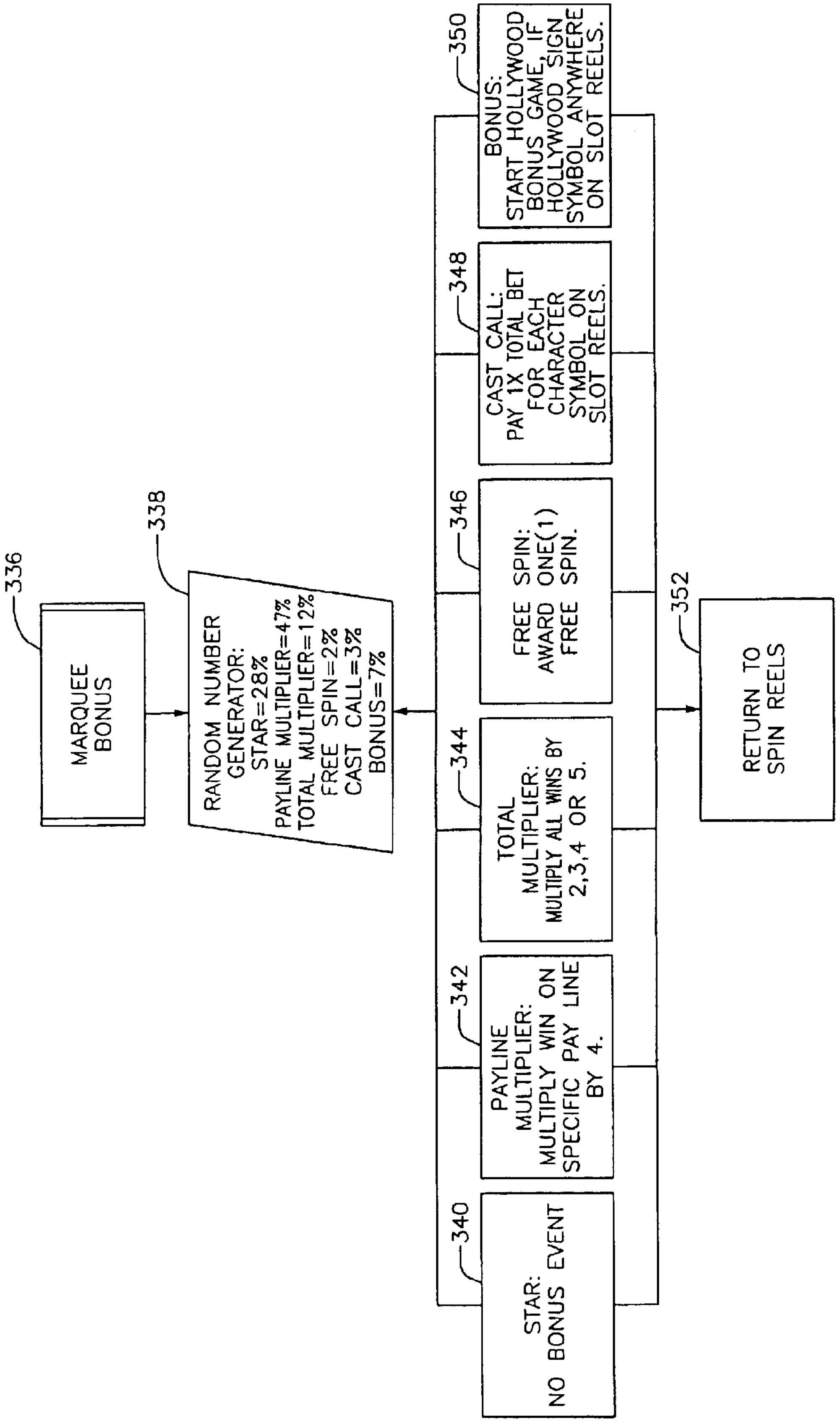
FIG. 8 is a flowchart for the on-screen bonuses.

The processor also, at 328, calculates any border feature into the calculation of the overall award to the player, displays at 330 the amount of the award and at 332 highlights the winning combinations Primary Game Bonuses In tallying the overall win or score for the primary game at 334, the processor 12 accounts for any bonus condition contributed by the border or marquee feature of the present invention. FIG. 8, shows the determination of the award from the border features. The processor 12 at 336 determines the contribution, if any, from the marquee bonus feature of the present invention. Through a random number generator, at 338 one of the marquee features is selected for display and application. As shown in FIG. 8, each feature has a predetermined probability of being selected. Those features, as represented by symbols to be displayed in the marquee (border 200) include, as described above;

1. Star. If data representing the star symbol 200 is selected at 340, there is no bonus or multiplier applied by the marquee feature. This no action condition will occur 28% of the time. If selected the processor 12 controls the display 10 to highlight a star 202 in the border 200.

2. Pay line Multiplier. According to this feature, if a marker 30*a–r* is selected at 342, the processor applies a multiplier to the corresponding pay line such as by controlling the display to display, for the selected marker 30*a–r* "2×" indicating that any winning combination on that pay line will have the award doubled. Other multipliers of three, or four times the award or more may be provided. This feature has a statistical probability of being selected 47% of the time.

3. Total multiplier. According to this feature, if a total multiplier symbol is selected at 344 (such as 208), then all pay line awards are multiplied by the selected multiplier. The selected multiplier may be between 2 and 5 times the total award. This feature has a statistical probability of being selected 12% of the time.

4. Free spin. In the event the RNG at 338 selects the free spin feature at 346 and highlights the free spin symbol 204 on the border 200, the next spin for the player is free. This feature has a statistical probability of being selected 2% of the time. The subsequent free spin will apply the same activated pay lines and wagers.

5. Cast Call, On-screen Bonus. In the event that the cast call feature is selected at 348, the cast call symbol 206 is highlighted and should the player, for the spin, obtain at the game display 20 one or more predetermined symbols, the player will receive a bonus. Thus, the cast call feature enables an on-screen bonus which is triggered by the display of a predetermined game symbol on the reels 28*a–e*. According to the embodiment shown, the cast call bonus is triggered by the display on the reels 28*a–e* of one or more of the game symbols 32*b, c* and *l* and the award is the total amount wagered times the number of triggering symbols. This feature has a statistical probability of being selected 3% of the time.

6. Hollywood Bonus. According to this feature, if the processor 12 selects data representing the bonus symbol, which may the word "Hollywood" (or shown as "Bonus" in FIG. 1), at 350, the symbol on the border 200 is highlighted and the game display 20, after the game symbol selection, displays a triggering symbol, e.g. the word "Hollywood", the player is entitled to a second screen game bonus play as hereinafter described. This feature has a statistical probability of being selected 7% of the time.

At 352, after the border 200 feature symbols have been selected and displayed, the processor 12 returns to the primary game to spin the reels 28*a–e*. It should be understood that border 200 features could be selected and displayed after the game symbols have been selected or substantially simultaneously with the selection.

Second Screen Bonuses

Figure 5:
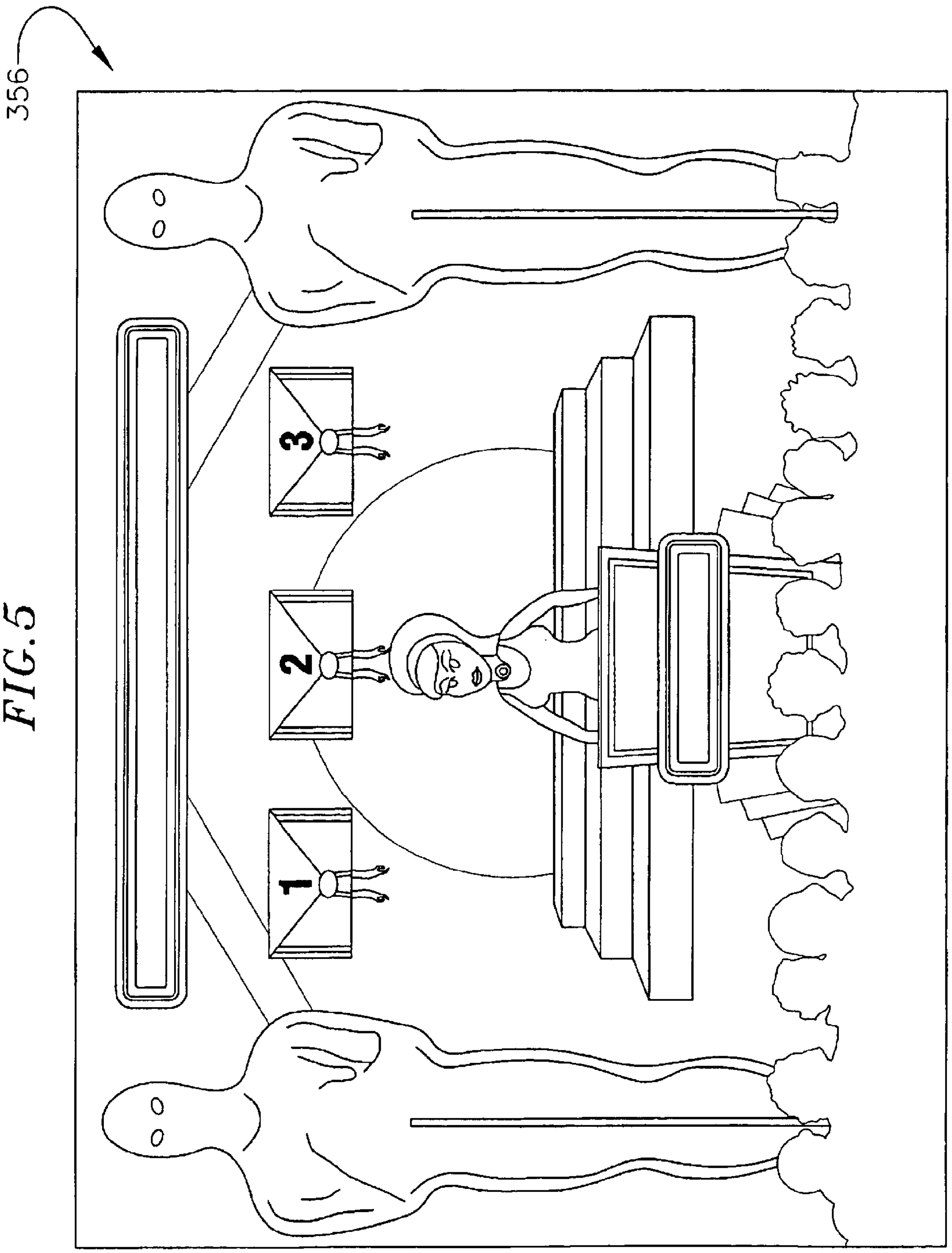
FIG. 5 shows a second display for the awarding of a bonus according to the present invention.
Figure 9:
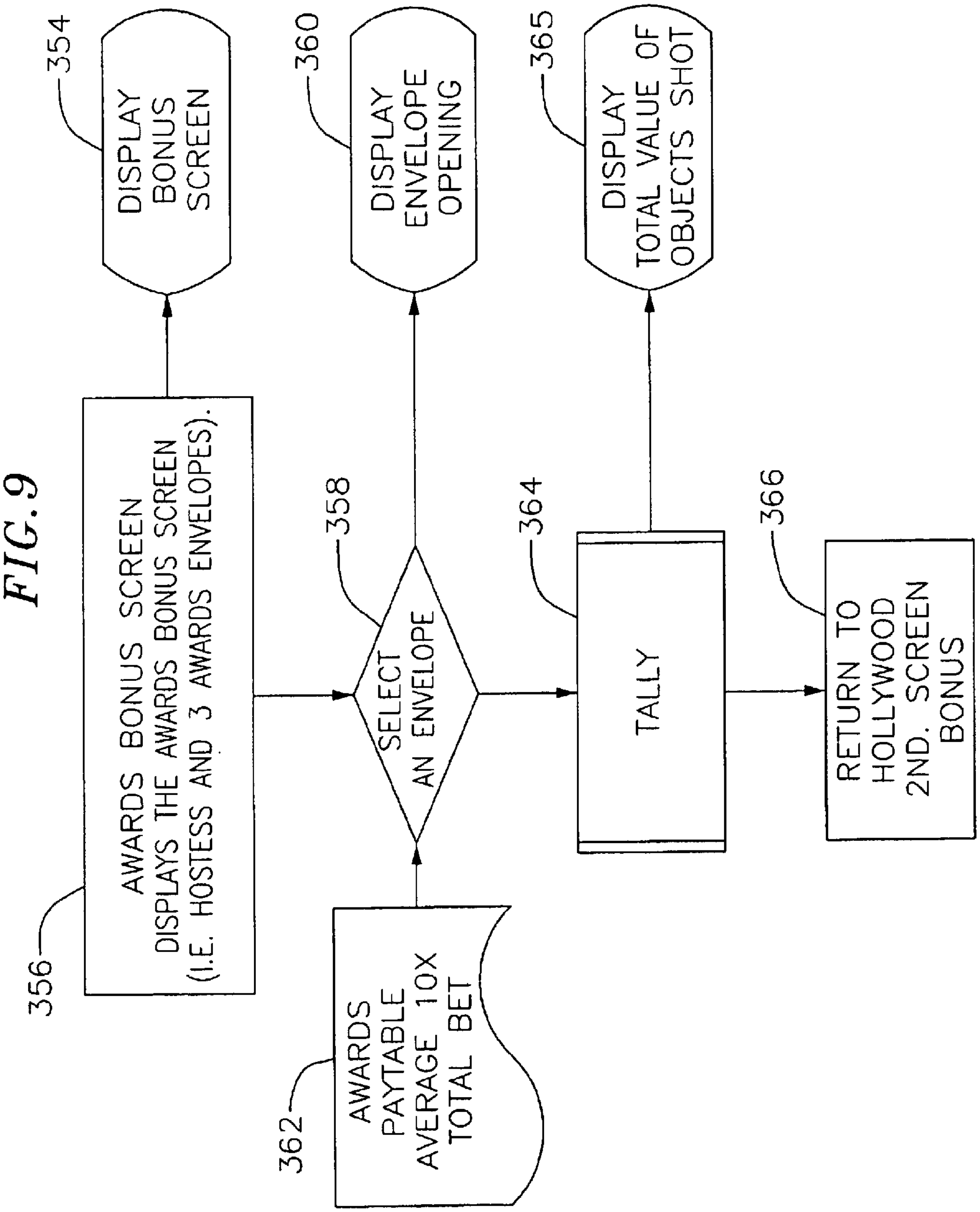
FIG. 9 is a flowchart for the second screen bonus of FIG. 5.

Another bonus which may be provided according to the present invention is a scatter bonus. Scatter bonuses, as is known in the art, provide a bonus when a predetermined number or more of certain selected symbols are displayed in a predetermined fashion on the game display. Some scatter bonuses require a predetermined number, e.g. three, symbols to be displayed on three adjacent reels for the scatter bonus to be awarded. According to the present invention, a scatter bonus is awarded when three of more symbols 32*d* are selected and displayed at any position on the display 10. With reference to FIG. 9, three symbols 32*d* are displayed at 356 the processor 12 is prompted to, at 354, display a scatter bonus award screen 356. The screen 356 depicts a stage where three award envelopes are shown as depicted in FIG. 5. The player is prompted to select at 358 one of the displayed envelops by touching one of the envelopes. The processor 12 controls the display 10 to display the selected envelop opening at 360 to reveal a bonus. The processor 12 randomly selects at 362 a total bet multiplier. The average multiplier is preselected to be a multiplier of ten. At 364 the bonus is tallied, awarded and displayed at 365. At 366 the processor 12 returns to the primary game display.

Figure 6:
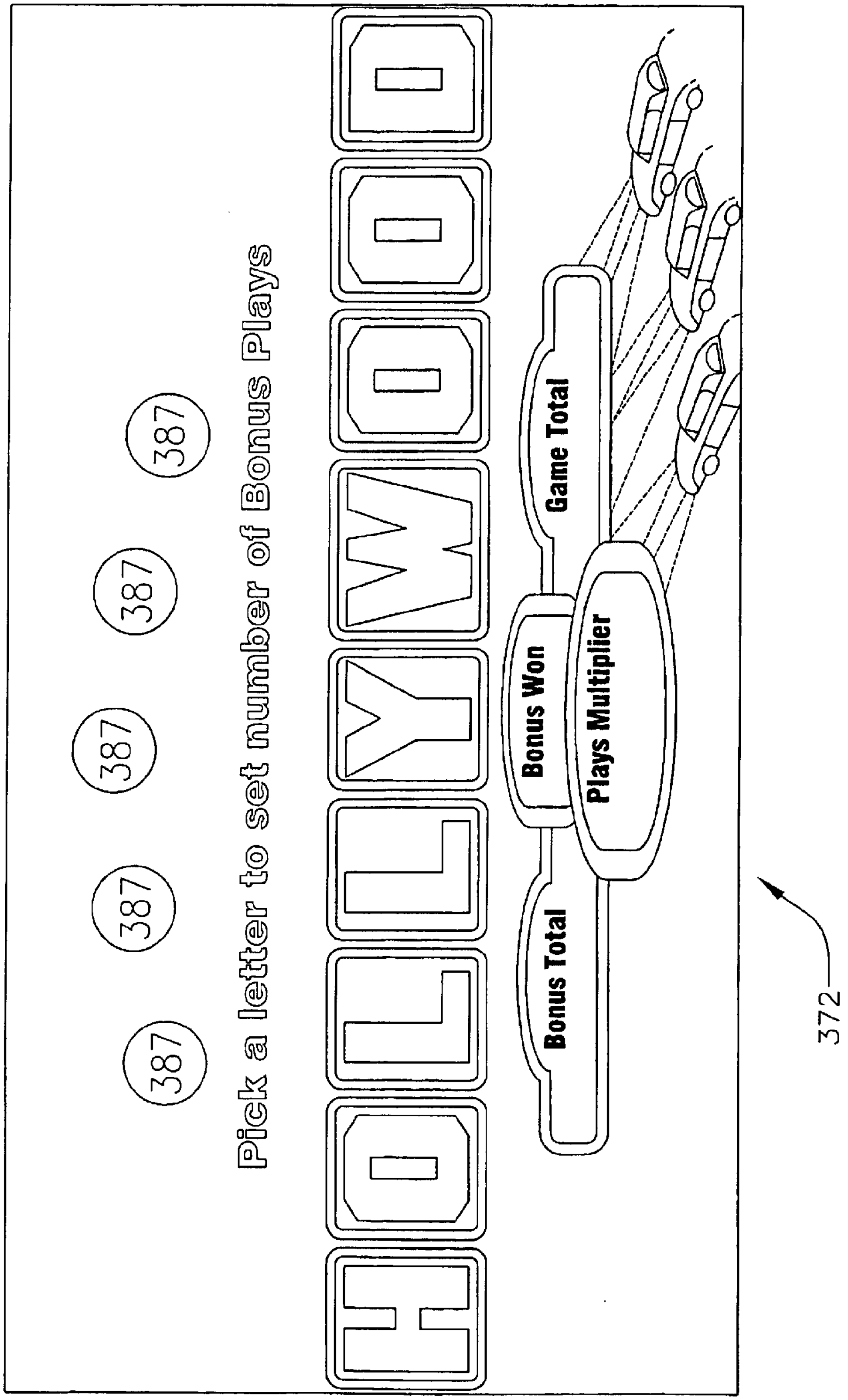
FIG. 6 shows a further second screen for awarding different bonus.
Figure 10:
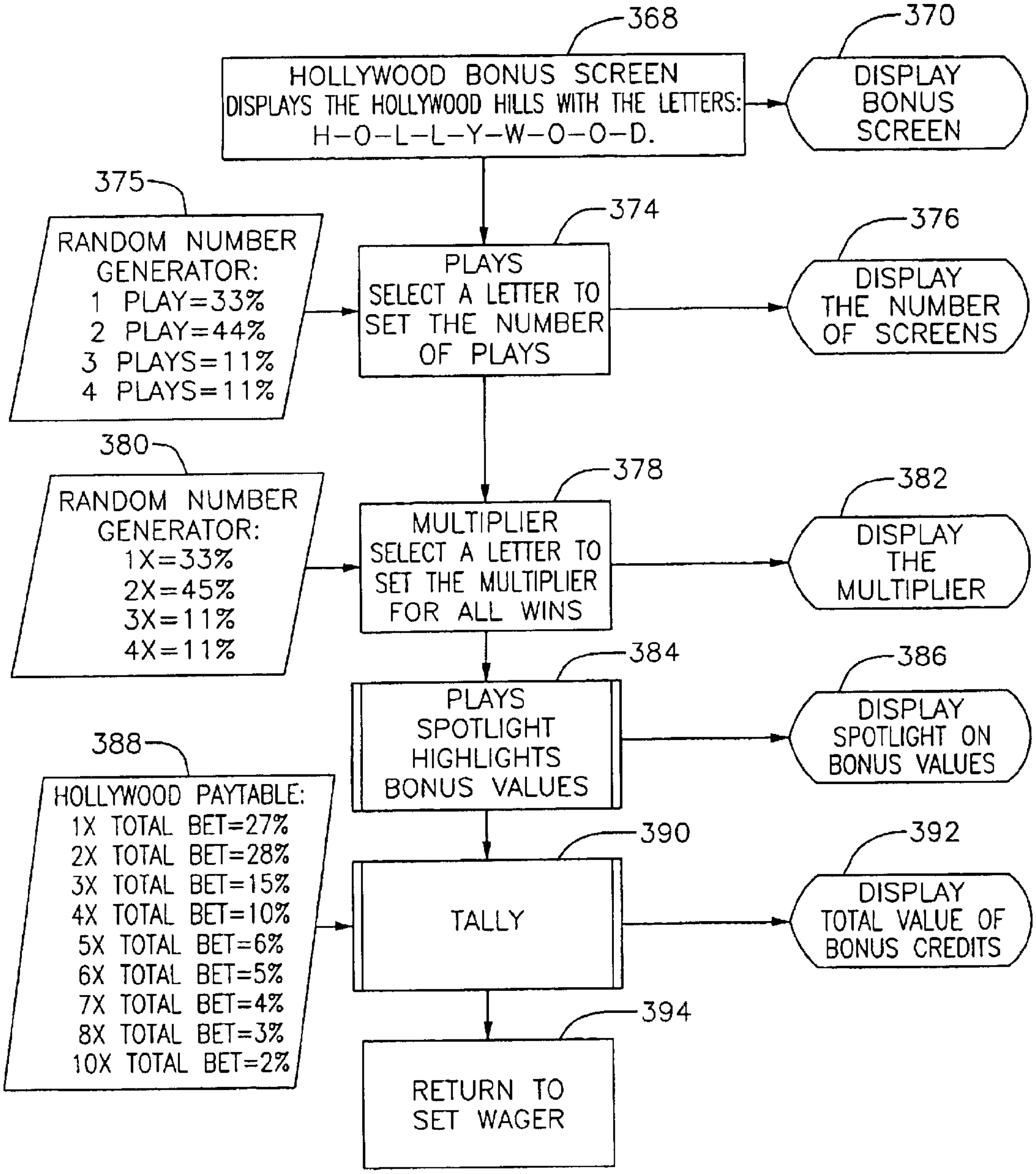
FIG. 10 is a flowchart for the second screen bonus of FIG. 6.

Another bonus which can be offered is based upon the border 200 displaying a bonus symbol and a triggering "Hollywood" (or "Bonus") symbol being selected and displayed on the game display as shown at 368 (FIG. 7). When this feature occurs, the processor 12 at 370 displays the Hollywood bonus, secondary screen 372 as shown in FIGS. 6 and 10. In this bonus feature, the player selects a letter from the displayed "H-O-L-L-Y-W-O-O-D" by touching the same. Upon selection of the letter, the processor 12 at 374, using a RNG 375, randomly selects from between 1 and 4 a number of bonus plays and at 376 displays the selected number of bonus plays. For example, the RNG and processor 12 may be configured to provide the following statistical probability for selection of the multiplier.

| | |
|---|---|
| 1 Bonus Play | 33% |
| 2 Bonus Plays | 45% |
| 3 Bonus Plays | 11% |
| 4 Bonus Plays | 11% |

At 378 the player selects another letter prompting the processor 12 to select a multiplier for all winning combinations for each of the selected number of bonus plays. Using a RNG at 380, the processor 12 randomly selects a multiplier from a schedule of multipliers ranging from one to four times all winning combinations. The RNG and processor 12 may be configured to provide the following statistical probability for selection of the multiplier.

| | |
|---|---|
| 1X | 33% |
| 2X | 45% |
| 3X | 11% |
| 4X | 11% |

At 382 the selected multiplier is displayed on the screen 372 for the player to see.

Upon selection of the number of plays and multiplier, the processor 12 at 384 controls the display to play the bonus. The processor 12 controls the display to display multiple bonus values, shown in FIG. 6 as bonus values 387. The bonus values are 388 randomly selected and displayed from a schedule of values which, in turn, are based upon the players total wager for the spin which resulted in this bonus. For example, the value schedule may be based upon the following statistical distribution of total wager multipliers.

| | |
|---|---|
| 1X total wager | 27% |
| 2X total wager | 28% |
| 3X total wager | 15% |
| 4X total wager | 10% |
| 5X total wager | 6% |
| 6X total wager | 5% |
| 7X total wager | 4% |
| 8X total wager | 3% |
| 10X total wager | 2% |

Thus, if the player has wagered five units on nine pay lines for a total wager of forty-five units, there is a 27% probability that the processor for one of the bonus values will select a 45 unit bonus, e.g. 1×45. For each bonus value, a bonus is randomly selected.

For each of the awarded bonus plays the processor 12 randomly selects and at 384 controls the display to highlight the bonus selected which is tallied at 390. The running tally is displayed at 392. Upon the conclusion of the final bonus play, the total of all bonuses is awarded and at 394 added to the game play credits. The processor 12 at 390 tallies the amount of the bonus win for each spin from all sources for this bonus and at 392 displays the award. At 394 the processor 12, at the conclusion of the bonus spins, returns the game to the primary game mode.

With reference to FIG. 6, the screen 372 includes areas to display the bonuses won, total games for the set of bonus game (which is decremented after each bonus game), the multiplier and total award of the bonus.

It should be understood that the apparatus and method of the present invention can be configured to include one, both or more secondary bonus screen games as hereinafter described. Further, the distribution of the applicable multipliers may be changed, fixed or random as desired. For the border 200 contributed bonus features, other bonuses may be included.

As can be appreciated the configuration of the device and method to use the border 200 to select bonuses and other features contributes to the excitement and entertainment value of the game.

While we have shown and described certain embodiments of the present invention, it should be understood that the same may be modified without departing from the spirit and scope of the appended claims.

We claim:

1. An electronic apparatus for playing a casino game comprising:

a video display;

a data structure storing data corresponding to the display of game symbols, at least one of which is designated a bonus trigger;

a processor to control the display and an input device to prompt the processor for each play of successive hands, when prompted said processor configured to select and assign game symbol data from said data structure to each coordinate in a displayed X by Y game matrix and to display the corresponding game symbol, said game matrix defining one or more pay lines;

a wager input device for a player to wager on and activate one or more pay lines;

said processor controlling said display to display for each hand of play an active border at the margin of the game matrix including a no action indicator and at least one of a multiplier or a bonus activating indicator and for each hand of play selecting at said active border from said no action indicator or said at least one of a multiplier or a bonus activating indicator, wherein said selection is independent of said game symbol data selected and displayed in said game matrix; and if said multiplier is selected, said processor comparing combinations of selected game symbols assigned into the game matrix along each activated pay line to determine winning or losing pay line game symbol combinations and to issue an award for each predetermine winning game symbol combination on an activated pay line, increasing at least a portion of the award by said multiplier;

if a bonus activator indicator is selected, said processor comparing the selected game symbols to determine if said bonus has been triggered and if said bonus is triggered, issuing a bonus; and if a no action indicator is selected, said processor issuing a base award without either increasing the award or issuing a bonus.

2. The apparatus of claim 1 wherein said processor controls said display to display said no action indicator and at least one of a multiplier or a bonus activating indicator in advance of the display of said game symbols and said processor selects prior to each hand of play from one of said no action indicator or said at least one of a multiplier or a bonus activating indicator for each hand of play.

3. The apparatus of claim 1 wherein said processor controls said display to display said no action indicator and at least one of (i) a multiplier or (ii) a bonus activating indicator substantially simultaneously with the display of said game symbols and said processor selects prior to each hand of play from one of said no action indicator or said at least one of (i) a multiplier or (ii) a bonus activating indicator for each hand of play.

4. An electronic apparatus for playing a casino game comprising:

a video display;

a data structure storing data corresponding to the display of game symbols, at least one of which is designated a bonus trigger;

a processor to control the display and an input device to prompt the processor for each play of successive hands, when prompted said processor selecting and assigning game symbol data from said data structure to each coordinate in a displayed X by Y game matrix and to display the corresponding game symbol, said game matrix defining one or more pay lines;

a wager input device for a player to wager on and activate one or more pay lines;

said processor controlling said display to display for each hand of play an active border including a no action indicator and indicia representing at least one of a pay line multiplier, an award multiplier, a free spin indicator, or a bonus activating indicator at least at one margin of the game matrix and for each hand of play selecting at said active border said no action indicator or one of said indicia represent at least one of a pay line multiplier, an award multiplier, a free spin indicator, or a bonus activating indicator, wherein said selection is independent of said game symbol data selected and displayed in said game matrix; and said processor comparing the selected and displayed game symbols and issuing an award for any activated pay line including a predetermined winning symbol combination, wherein (i) if a pay line multiplier is selected at said active border for any pay line including a predetermined winning combination, issuing an award multiplied by said pay line multiplier, (ii) if an award multiplier indicia is selected at said active border, issuing an award for all predetermined winning outcomes multiplied by said award multiplier, (iii) if a bonus activator indicator is selected at said active border, comparing the selected game symbols for a game symbol designated a bonus trigger to determine if said bonus has been triggered and if said bonus is triggered, issuing a bonus award, (iv) if a free spin indicator is selected at said active border, conducting at least one additional hand of play without further wagering by said player and issuing an award for any winning combinations obtained during said at least one additional hand of play, and (v) if a no action indicator is selected at said active border, issuing only a base game award to said player.

5. The device of claim 4 wherein said processor controls the display to display said active border about the periphery of the game matrix.

6. A method of conducting a gambling game for a player at a gaming machine using a set of game symbols wherein winning combinations are defined by one or more of said game symbols, at least one of said game symbols being designated a bonus trigger, comprising:

the player placing a wager to activate one or more pay lines on a game matrix;

displaying at least a no action indicator and a bonus activating indicator at an active border;

independently selecting one of said no action indicator or bonus activating indicator;

selecting game symbols from said set of game symbols;

assigning the selected game symbols into said game matrix;

displaying said game matrix including said assigned game symbols;

examining said game matrix to determine whether the assigned game symbols along any activated pay line form a winning combination;

if said no action indicator is selected at said active border, issuing only a base game award to said player for any winning combinations; and if said bonus activating indicator is selected at said active border, examining said game matrix for a game symbol designated a bonus trigger and, if said bonus trigger is displayed in said game matrix, issuing a base game award to said player for any winning combinations and triggering a bonus.

7. The method of claim 6 wherein said step of selecting one of said no action indicator or bonus activating indicator occurs prior to said steps of selecting game symbols from said set of game symbols and assigning the selected game symbols into said game matrix.

8. The method of claim 6 further comprising:

displaying a multiplier in addition to said no action indicator and said bonus activating indicator at an active border;

selecting one of said no action indicator or bonus activating indicator or multiplier; and if said multiplier is selected at said active border, issuing a base game award to said player for any winning combinations wherein at least one of said base game awards is multiplied by said multiplier.

9. The method of claim 6 further comprising:

displaying a free spin indicator in addition to said no action indicator and said bonus activating indicator at an active border;

selecting one of said no action indicator or bonus activating indicator or free spin indicator; and if said free spin indicator is selected at said active border, issuing a base game award to said player for any winning combinations, conducting at least one additional hand of play without the player placing an additional wager, and issuing a base game award to said player for any winning combinations obtained in said additional hand of play.

10. The method of claim 6 further comprising:

displaying a multiplier and a free spin indicator in addition to said no action indicator and said bonus activating indicator at an active border;

selecting one of said no action indicator or bonus activating indicator or multiplier or free spin indicator;

if said multiplier is selected at said active border, issuing a base game award to said player for any winning combinations wherein at least one of said base game awards is multiplied by said multiplier; and if said free spin indicator is selected at said active border, issuing a base game award to said player for any winning combinations, conducting at least one additional hand of play without the player placing an additional wager, and issuing a base game award to said player for any winning combinations obtained in said additional hand of play.

11. A method of conducting a gambling game for a player at a gaming machine using a set of game symbols wherein winning combinations are defined by one or more of said game symbols, comprising:

the player placing a wager to activate one or more pay lines on a game matrix;

displaying at least a no action indicator and a multiplier at an active border;

independently selecting one of said no action indicator or multiplier;

selecting game symbols from said set of game symbols;

assigning the selected game symbols into said game matrix;

displaying said game matrix including said assigned game symbols;

examining said game matrix to determine whether the assigned game symbols along any activated pay line form a winning combination;

if said no action indicator is selected at said active border, issuing only a base game award to said player for any winning combinations; and if said multiplier is selected at said active border, issuing a base game award to said player for any winning combinations wherein at least one of said base game awards is multiplied by said multiplier.

12. The method of claim 11 wherein said step of selecting one of said no action indicator or multiplier occurs prior to said steps of selecting game symbols from said set of game symbols and assigning the selected game symbols into said game matrix.

13. The method of claim 11 further comprising:

displaying a free spin indicator in addition to said no action indicator and said multiplier at an active border;

selecting one of said no action indicator or multiplier or free spin indicator; and if said free spin indicator is selected at said active border, issuing a base game award to said player for any winning combinations, conducting at least one additional hand of play without the player placing an additional wager, and issuing a base game award to said player for any winning combinations obtained in said additional hand of play.

14. A method of conducting a gambling game for a player at a gaming machine using a set of game symbols wherein winning combinations are defined by one or more of said game symbols, comprising:

the player placing a wager to activate one or more pay lines on a game matrix;

displaying at least a no action indicator and a free spin indicator at an active border;

independently selecting one of said no action indicator or free spin indicator;

conducting a hand of play comprising:

selecting game symbols from said set of game symbols;

assigning the selected game symbols into said game matrix;

displaying said game matrix including said assigned game symbols; and examining said game matrix to determine whether the assigned game symbols along any activated pay line form a winning combination;

if said no action indicator is selected at said active border, issuing only a base game award to said player for any winning combinations and terminating further play by said player; and if said free spin indicator is selected at said active border, issuing a base game award to said player for any winning combinations, conducting at least one additional hand of play without the player placing an additional wager, and issuing a base game award to said player for any winning combinations obtained in said additional hand of play.

15. The method of claim 14 wherein said step of selecting one of said no action indicator or free spin indicator occurs prior to said steps of selecting game symbols from said set of game symbols and assigning the selected game symbols into said game matrix.

16. The method of claim 14 further comprising:

displaying a multiplier and a bonus activating indicator in addition to said no action indicator and said free spin indicator at an active border prior to said steps of selecting game symbols from said set of game symbols and assigning the selected game symbols into said game matrix;

selecting one of said no action indicator or bonus activating indicator or multiplier or free spin indicator prior to said steps of selecting game symbols from said set of game symbols and assigning the selected game symbols into said game matrix;

if said multiplier is selected at said active border, issuing a base game award to said player for any winning combinations wherein at least one of said base game awards is multiplied by said multiplier; and if said bonus activating indicator is selected at said active border, examining said game matrix for a game symbol designated a bonus trigger and, if said bonus trigger is displayed in said game matrix, issuing a base game award to said player for any winning combinations and triggering a bonus.

* * * * *